Inventor
William J. Melvin, Jr.
By H. G. Lombard
Attorney

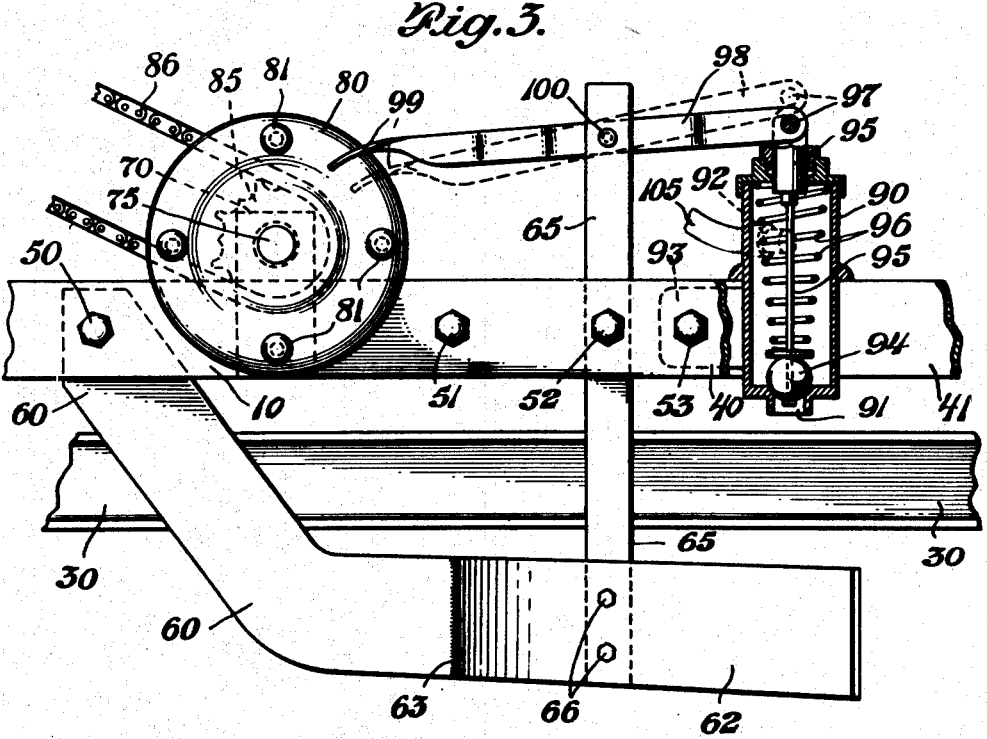
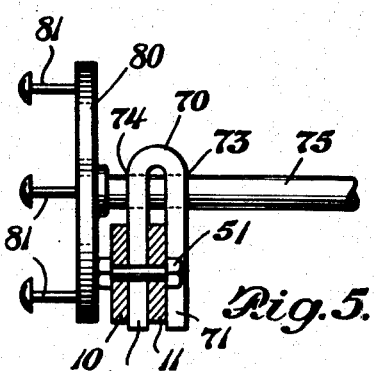

Patented Nov. 10, 1953

2,658,768

UNITED STATES PATENT OFFICE 2,658,768

FRAME ATTACHMENT FOR SUPPORTING WORKERS IN PLANTING

William J. Melvin, Jr., Tarheel, N. C.

Original application September 12, 1946, Serial No. 696,481, now Patent No. 2,506,430, dated May 2, 1950. Divided and this application April 6, 1950, Serial No. 154,257

2 Claims. (Cl. 280—32.5)

This invention relates, in general, to an improved planting apparatus and deals, more particularly, with improvements in a planting machine adapted to be attached to standard tractors and similar farming vehicles for use in the transplanting of young plants such as tobacco plants, and the like. The present application is a division of application Serial Number 696,481, filed September 12, 1946 and issued as U. S. Patent Number 2,506,430 on May 2, 1950.

A primary object of the invention is to provide a planting accessory designed for operation with practically any form of tractor already in use as a machine for settting and watering young plants in a procedure, which comprises, in general, the opening of a furrow for receiving a row of plants, supplying a quantity of water at spaced locations in the furrow where the plants are set, and filling in the furrow and pressing the earth about the newly placed plants.

Another object of the invention is to provide a planting attachment of this character embodying an improved and simplified construction for supplying water automatically in the furrow at predetermined spaced locations where the plants are deposited, and further, with ready provision for easily changing the spacing of such locations where the water is supplied to the furrow as may be necessary or desirable in accordance with the size and type of plants to be set.

A further object of the invention is to provide a planting attachment of the type described which is strong and durable, easily operated and of relatively simple construction that may be manufactured at comparatively low cost.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout the same, and in which:

Fig. 3 is a close-up, side elevational view of the furrow opener and valve and actuating mechanism for supplying water automatically to the furrow at spaced locations;

Fig. 4 is a fragmentary top plan view of Fig. 3 illustrating the construction providing for adjustment or change of the setting of the water supplying mechanism; and, Fig. 5 is a sectional view on line 5—5 of Fig. 4, looking in the direction of the arrows.

Figure 1:
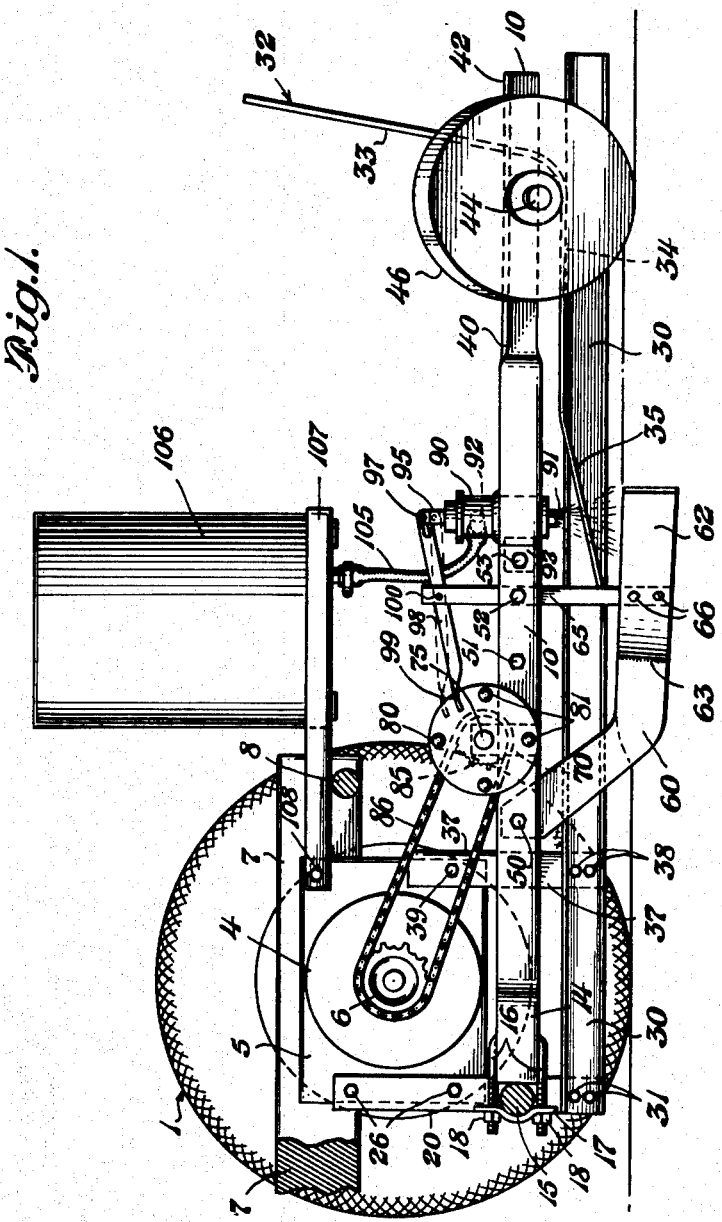
Fig. 1 is a side elevational view, partly in section, showing the improved planting attachment of the invention in operative connection with the rear of the chassis of a tractor or similar farming vehicle.
Figure 2:
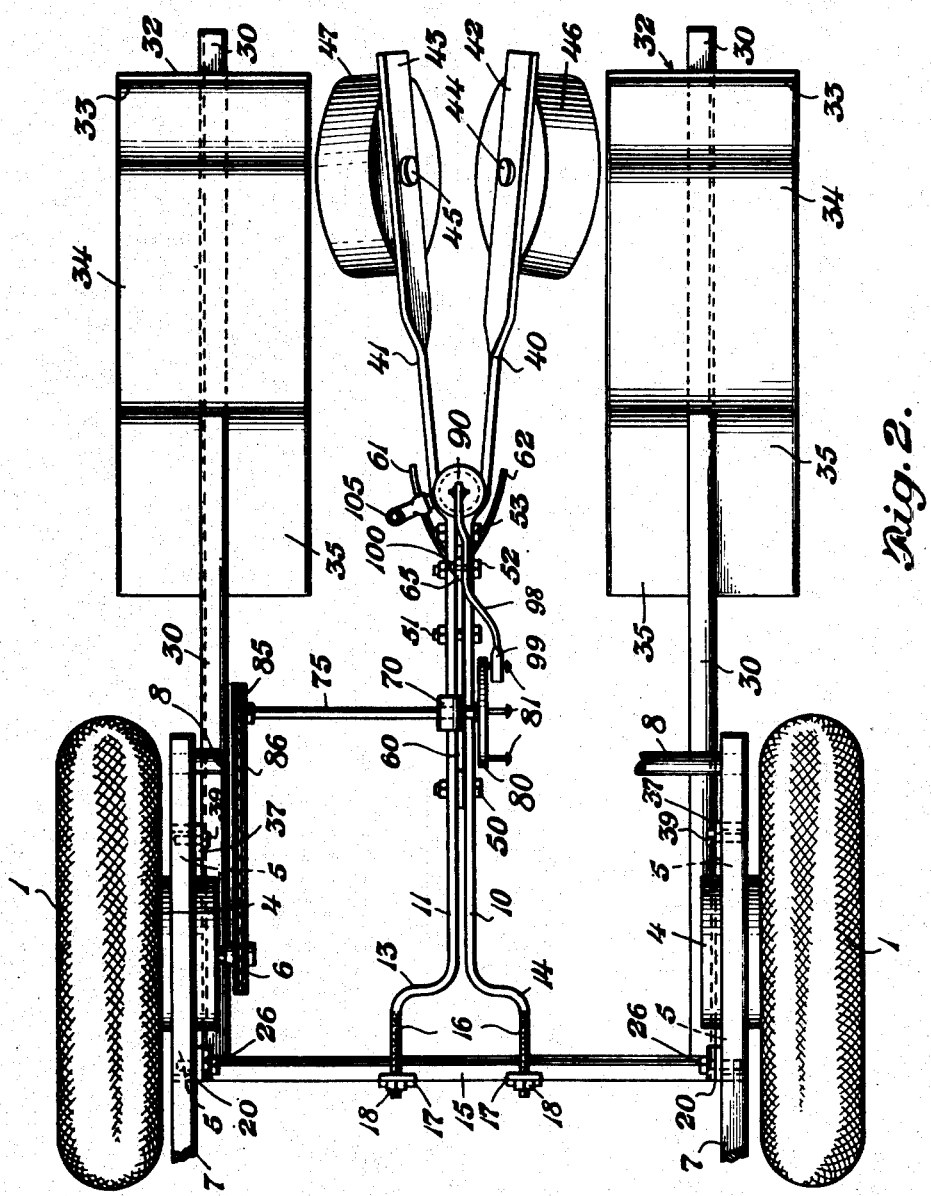
Fig. 2 is a top plan view of the improved planting attachment.

Referring now, more particularly, to the drawings, Figs. 1 and 2 are side and plan views, respectively, of the improved planting machine designed for operation with a standard tractor which is shown in part in the drawings, for purposes of illustration, as comprising the rear tractor wheels 1, wheel hub housings 4 provided with peripheral flanges 5, a drive gear accessory 6, and side frame members 7 carrying a transverse tow bar 8. A pair of main bars 10, 11 extend generally longitudinally of the machine to define a central beam serving as the supporting means for the operating mechanism of the invention. The forward ends of said bars 10, 11, are bent outwardly to define a yoke comprising arms 13, 14, connected to a cross bar 15 in any suitable manner. A relatively simple connection is shown provided by pairs of threaded studs 16 welded to the edges at the end of each bar 10, 11, in projecting relation thereto to receive the cross bar 15. Clamping plates 17 secured by nuts 18 threaded on the studs 16 hold the cross bar 15 connected to the bars, 10, 11, and capable of slight pivotal movement as may be necessary or desirable.

The ends of the cross bar 15 are welded, bolted or otherwise secured between the ends of vertical brackets comprising angle bars 20, which are so arranged that the angular sides of the bars fit over the forward corners of the flanges 5 around the hub housings 4 of each of the rear wheels 1 of a standard tractor. Such housing flanges 5 are conventional on all modern tractors and are provided with threaded openings for receiving bolts to detachably connect cultivators and various other farming equipment to be drawn by the tractor, as desired. Accordingly, it is a simple matter to attach the vertical brackets 20 to the housing flanges 5 by bolts 26 and such connection is firm and rigid by reason of the abutting engagement of the sides of the angle bars with the adjacent corners of the housing flanges 5, as aforesaid.

As best seen in Fig. 1, longitudinal side rails 30 are bolted as at 31 or otherwise secured to the lower ends of the vertical brackets 20 in generally parallel relation to the beam bars 10, 11, and these rails carry seats 32 on either side of the machine for one or two workers who set the plants into a furrow as the machine is drawn by the tractor. These seats may be of any desired type designed to be mounted upon the rear free ends of the side rails 30 in any suitable way. In the present illustration, the seats 32 are of a simple construction provided by a sheet of metal bent to form a back rest 33, a base 34 welded or otherwise secured to the rails 30, and leg rests 35 defined by bifurcated extensions straddling a side rail 30 and secured thereto. These side rails carrying the seats 32 are also supported in generally parallel and spaced relation to the ground by rear vertical brackets comprising angle bars 37 which are bolted as at 38, Fig. 2, or otherwise secured to said side rails 30 and attached to the rear of the housing flanges 5 by one or more bolts 39.

The rearward ends of the beam bars 10, 11, are bent intermediately in outward relation to each other to define a generally V-shaped fork comprising arms 40, 41. The arms of the fork are twisted to provide end portions 42, 43, in outwardly diverging relation and these end portions have suitable openings to receive spindles 44, 45, for rotatably mounting a pair of cooperating packing rollers 46, 47, in outwardly inclined relation. These rollers support the beam bars 10, 11, above the ground and are disposed in outwardly inclined relation in order to move the earth from a furrow back into the furrow in the most effective manner in completing the planting operation. The bars 10, 11, otherwise are united by spaced bolts 50, 51, 52 and 53 to provide a strong, unitary central beam and these bolts have additional functions, as presently to be described.

The bolt 50 secures in the space between the bars 10, 11, the forward end of an elongated plate-like member 60, which comprises a pair of diverging blades 61, 62, Fig. 2, defining a plow shoe for opening a furrow. Such a furrow opener is provided in a relatively simple construction by an outwardly bent end portion on the plate 60 defining blade 61, while a similar blade 62 is joined thereto by welding as at 63, Figs. 1 and 3, or by any other suitable means. A post 65 secured between the bars 10, 11, by bolt 52 and connected to the furrow opener as by one or more bolts 66, Figs. 1 and 3, supports the same in operative position.

Between the bolts 50, 51, Figs. 2 and 4, a generally U-shaped shaft support 70 is mounted in adjustable relation longitudinally of the beam bars 10, 11. As seen in Fig. 5, the U-shaped shaft support 70 comprises a pair of legs 71, 72, provided with aligned openings 73, 74 providing spaced bearings for a transverse shaft 75. Said legs 71, 72 straddle the bar 11 with the inner leg 72 received in the space between the beam bars 10, 11, and clamped by the bolts 50, 51 in any selected position of adjustment longitudinally of said bars.

A rotatable trip wheel 80 is keyed to the adjacent end of the shaft 75 and is provided with projecting trip pins 81 having an equal spacing on said wheel around the axis thereof. A changeable sprocket or gear wheel 85 is removably attached to the opposite end of said shaft and is connected by a sprocket chain 86 to the drive gear 6 extending from the wheel hub housing 4 of the tractor. The drive gear 6 is conventional equipment provided on the inner side of the wheel hub housing 4 of a tractor as a driving means for various types of farming equipment which may be used with the tractor. It is, therefore, a relatively simple matter to connect the sprocket chain 86 to the drive gear 6 for driving the sprocket wheel 85 which in turn rotates the shaft 75 and trip wheel 80 mounted thereon. Although not shown, any appropriate conventional chain tightener may be employed to take up slack in chain 86 as a result of slight pivotal movement of the beam bars 10, 11.

A water valve comprising a cylinder or casing 90 is mounted in the bight of the V-shaped fork defined by the outwardly bent arm portions 40, 41 of the beam bars 10, 11. The valve, Fig. 3, includes a water outlet port 91 and an inlet port 92. A ball valve 94 on an axially reciprocable rod 95 normally closes the outlet port 91 under influence of a contractile coil spring 96 telescoped over the rod 95 and bearing against the cap of the cylinder to exert a constant pressure on the ball valve 94 to hold the same in closed relation to said outlet port 91. The reciprocable valve rod 95 is slidably mounted through the water-tight top of the valve casing 90 and the outer free end thereof is hinged by a pintle 97 to a crank lever 98. The valve cylinder thus provided may be secured in mounted position on the beam bars 10, 11, in any suitable way, and in the present example, a simple construction is shown comprising an integral apertured ear or projection 93 provided on the casing 90 in position to fit between the central bars 10, 11 and be secured by bolt 53 to hold said valve casing 90 in mounted position.

The lever 98 is pivotally mounted at 100 on the same post 65 which is secured by bolts 52 to the bars 10, 11 and which supports the furrow opener 60 at the lower end thereof by the bolts 66. The lever 98 may be of any suitable design and preferably is twisted to define a flat, slightly arcuate cam finger portion 99 on its free end which extends into the path of the trip pins 81 on the rotating wheel 80 so as to be engaged by said pins in succession to actuate the water valve periodically.

Water to the valve casing 90 is supplied through the inlet port 92 by a hose 105 connected to a tank 106 carried by a shelf 107 mounted on the tractor frame members 7 in any suitable way. A relatively simple arrangement of this character is shown in Fig. 1 wherein the shelf 107 rests on the tow bar 8 and is bolted at 108 to the flanges 5 on the wheel hub housings 4. If desired, the tank 106 may be mounted on supports carried by the beam bars 10, 11, and/or side rails 30.

Accordingly, as the trip wheel 80 rotates, the pins 81 each in turn is adapted to engage the cam finger 99 and thereby actuate the lever 98 for a short period during which the lever is caused to move about its pivot 100 to the position represented in dotted lines, and in so doing, lifts the valve rod 95, which compresses the coil spring 96, and raises the ball valve 94 from the outlet port 91 to permit a quantity of water to flow into the furrow. As a trip pin 81 moves out of engagement with the lever 98, the lever, which is connected to the valve rod 95 by pintle 97, is caused to return to initial position under force of the coil spring 96 on said valve rod 95 and this movement also causes the ball valve 94 to return to the normal position thereof closing the outlet port 91. The lever 98 is thereby returned automatically to its initial position in which the cam finger 99 thereon is disposed in the path of the next succeeding trip pin 81. As each trip pin 81 in turn moves into and out of engagement with the lever 98, a similar action takes place to open the valve and permit a flow of water into the furrow at predetermined spaced locations.

In operation, it will be understood that with the planting machine attached to a tractor in the manner described, one or two workers who place the plants in the furrow are seated in the seats 32. As the planting machine is drawn by the tractor, a furrow is opened by the plow shoe 60 and the earth spread apart by the diverging blades 61, 62 thereof. The drive gear 6 actuates the sprocket chain 86 to drive gear 85 which rotates the shaft 75 and the trip wheel 80 carried thereby. As the trip wheel 80 rotates, the trip pins 81 thereon successively engage the cam finger 99 on the lever 98 to move the same as represented by the dotted lines in Figs. 1 and 3, thus actuating the water valve 90 to permit a quantity of water to flow into the furrow at predetermined spaced locations. At each location where water is supplied, a plant is set by a worker, or by one of two workers setting plants alternately. The workers sit within easy reaching distance of the location where the water flows into the furrow from the valve 90, and, of course, when the plants are individually set by hand in this manner, they are necessarily planted properly and at correct depth and alignment in the furrow in the most effective manner. After the plants are set, the packing rollers 46, 47 come into position to move the earth back into the furrow and compress the earth around the newly placed plants.

An important feature of the invention resides in the provision for ready change of the spacing of the locations in which water is supplied to the furrow. The type and size of the plants, of course, determine the required spacing thereof and accordingly, the machine is designed to be adjusted to supply water at locations having a greater spacing for larger plants, or less spacing for smaller plants. This is readily accomplished simply by substituting for the changeable sprocket wheel or gear 85, a smaller gear when the space between plants is to be reduced, or a larger gear when the spacing is to be increased. A larger gear 85 reduces the speed of rotation of the trip wheel 80 to cause a less frequent operation of the water valve thereby providing an increased spacing between locations where water is supplied to the furrow. Conversely, a smaller gear 85 effects a more rapid rotation of the trip wheel 80 to cause the water valve to be actuated at more frequent intervals and thereby reducing the spacing between locations where water is supplied into the furrow. In the substitution of gears for this purpose, any necessary slack or take-up in the sprocket chain 86 is readily compensated for through changing the position of the shaft 75 by adjusting the shaft support 70 as necessary. This is accomplished simply by loosening the bolts 50, 51, adjusting the shaft support 70 longitudinally of the beam bars 10, 11, as necessary for the sprocket chain 86 to fit properly over the sprocket wheel 85 and drive gear 6, and then tightening said bolts 50, 51 to clamp the shaft support 70 between the bars 10, 11, in adjusted operating position.

While the invention has been described in detail with a specific example such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. Apparatus provided as an attachment for a vehicle comprising a longitudinal side rail at each side of the apparatus, a continuous cross bar connected between the forward portions of said side rails and maintaining the same in spaced relation, spaced vertical bars connected at their lower ends to the forward portion of each of said side rails at spaced points, the upper ends of said spaced vertical bars being adapted to be attached directly to the vehicle at spaced points to fixedly support said forward portions of said side rails as cantilevers with the rearward portions thereof extending free and spaced above the ground for carrying a worker, a beam comprising a pair of spaced bars extending longitudinally of the apparatus between said side rails and pivotally connected at its forward end portion to said cross bar, wheels secured to the rearward ends of said beam bars for supporting said beam above the ground in cooperation with said cross bar, said beam being pivotally connected at its forward end portion so that it may move upwardly or downwardly independently of said fixedly supported side rails.

2. Apparatus adapted to be drawn by a vehicle comprising a rail and a seat on said rail comprising a seat portion supported on said rail in line therewith, said seat having spaced forward extensions and being secured to said rail with said rail extending through the space between said spaced forward extensions, said forward extensions being inclined downwardly and extending along the opposite sides of said rail in the form of longitudinal surfaces defining leg rests for an operator seated on said seat.

WILLIAM J. MELVIN, JR.

References Cited in the file of this patent

UNITED STATES PATENTS

| Number | Name | Date |
|---|---|---|
| 423,723 | Bemis | Mar. 18, 1890 |
| 423,724 | Bemis | Mar. 18, 1890 |
| 520,478 | Bemis | May 29, 1894 |
| 716,735 | Mitchell et al. | Dec. 23, 1902 |
| 1,267,713 | Thompson | May 28, 1918 |
| 1,694,252 | Doepke | Dec. 4, 1928 |
| 1,886,457 | Winkley | Nov. 8, 1932 |
| 1,888,143 | Poll | Nov. 15, 1932 |